United States Patent
Chen et al.

(10) Patent No.: US 8,010,069 B2
(45) Date of Patent: Aug. 30, 2011

(54) METHOD AND APPARATUS FOR PROCESSING RADIO SIGNALS TO IDENTIFY AN ACTIVE SYSTEM IN A COEXISTING RADIO NETWORK

(75) Inventors: Kwang-Cheng Chen, Taipei (TW); Chung-Kai Yu, Nantou (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 519 days.

(21) Appl. No.: 12/338,274

(22) Filed: Dec. 18, 2008

(65) Prior Publication Data

US 2009/0258597 A1    Oct. 15, 2009

(51) Int. Cl.
*H03M 1/18* (2006.01)
(52) U.S. Cl. .................... 455/161.1; 455/67.14
(58) Field of Classification Search ............... 455/162.2, 455/226.1, 67.14, 150.1, 156.1, 164.1
See application file for complete search history.

(56) References Cited

U.S. PATENT DOCUMENTS

| | | | | |
|---|---|---|---|---|
| 5,487,178 A * | 1/1996 | Hanninen | .................. | 455/67.14 |
| 6,574,491 B2 * | 6/2003 | Elghazzawi | .................. | 600/323 |
| 7,676,205 B2 * | 3/2010 | Moffatt et al. | ............. | 455/226.1 |
| 2008/0267416 A1 * | 10/2008 | Goldstein et al. | ............... | 381/56 |
| 2010/0173586 A1 * | 7/2010 | McHenry et al. | ............... | 455/62 |

* cited by examiner

*Primary Examiner* — Peguy Jean Pierre
(74) *Attorney, Agent, or Firm* — Ming Chow; Sinorica, LLC

(57) ABSTRACT

The present invention discloses a method of multiple systems sensing for coexisting radio networks, including: performing energy detection and carrier locking; detecting the fundamental frequencies; and identifying the corresponding active systems from the detected fundamental frequencies and the evaluation of the estimated power spectrum density vector or the estimated trispectrum matrix. Based on the method, an apparatus capable of multiple systems sensing is presented. Furthermore, the present invention also provides an apparatus of multiple systems sensing for coexisting radio networks.

15 Claims, 4 Drawing Sheets

METHOD AND APPARATUS FOR PROCESSING RADIO SIGNALS TO IDENTIFY AN ACTIVE SYSTEM IN A COEXISTING RADIO NETWORK

BACKGROUND OF THE INVENTION

1. Field of the Invention

The present invention relates to multiple systems sensing for a coexisting radio network, and more particularly to multiple systems sensing for construction of a cognitive radio network or for UWB communications demanding Detect And Avoid (DAA).

2. Description of the Related Art

In wireless communication, due to the limited spectrum resource, the coexistence of variable radio systems over common spectrum is becoming a trend. For example, the UWB communications demanding Detect And Avoid (DAA) and the cognitive radio (CR) are two possible realizations that comply with the coexistence demand.

The concept of cognitive radio is that transmitters and receivers can alter communication parameters based on a variety of factors such as the nature of the communication being transmitted, the availability of licensed or unlicensed frequencies, network state, noise, bandwidth, etc. However, spectrum sensing of cognitive radios conventionally only possesses link level distinguishing ability (i.e. idle and thus available, or used and therefore unavailable). In the complicated case of cognitive radio networks (CRNs) with more cognitive radios incorporated in, spectrum sensing should achieve networking level functions that cognitive radio networks can communicate with either primary systems (maybe more than one primary system) or other cognitive radios (secondary systems) to optimize entire network efficiency over radio spectrum. Therefore, in addition to sensing the idle status of spectrum, identification of multiple systems is critical for establishing connections and building up the cognitive radio networks.

Spectrum sensing techniques traditionally include energy detection, CP existence, pilot detection, spatiotemporal sensing. Sensing under a multiple coexisting environment such as 2.4 GHz ISM band is considered by distributed classification. However, with inter-system interference, traditional techniques are not enough and thus a more reliable and general multiple systems sensing algorithm is needed to overcome this challenge. In the invention, we propose a methodology exploiting the system-specific identification of multiple active systems, over uncorrelated Rayleigh fading channels to identify spectrum utilization status. In addition to energy detection and carrier locking, we identify the fundamental frequencies of candidate communication systems periodically filtered by pulse shaping filters. To accomplish the multiple systems sensing, we have to further exploit the unique power spectrum density pattern of systems. If the additive noise is colored Gaussian with unknown covariance matrix, the power spectrum density pattern methodology might not apply. We may further make use of high-order statistics with cumulants that are blind to any kind of a Gaussian process to ensure the success of our multi-system sensing for cognitive radio networks.

SUMMARY OF THE INVENTION

The primary objective of the present invention is to provide a method for processing radio signals to identify an active system in a coexisting radio network, so that if the corresponding systems, such as 802.11b, 802.11g, Bluetooth and Microwave Oven are active, they can be easily identified from the detected fundamental frequencies, and the evaluation of the power spectrum density or the estimated trispectrum matrix.

Another objective of the present invention is further to provide an apparatus for processing radio signals to identify an active system in a coexisting radio network, so that if the corresponding systems, such as 802.11b, 802.11g, Bluetooth and Microwave Oven are active, they can be easily identified from the detected fundamental frequencies, and the evaluation of the power spectrum density or the estimated trispectrum matrix.

The present novel method and apparatus for processing radio signals to identify an active system in a coexisting radio network can be utilized to implement the DAA mechanism for UWB application, and to construct cognitive radio networks.

To achieve the foregoing objectives of the present invention, a method for processing a plurality of radio signals to identify an active status of a target system among a plurality of communication systems in a coexisting radio network, comprising the steps of: squaring the radio signals to produce a plurality of squared signals; filtering the squared signals to produce filtered signals containing a plurality of fundamental frequencies of the communication systems in the coexisting radio network; identifying the target system in the communication systems by detecting the frequency locations of peak energy corresponding to the fundamental frequencies in the filtered signals; estimating a power spectrum density of the target system; and identifying an active status of the target system by performing spectrum analysis.

To achieve the foregoing objectives, the present invention further provides an apparatus for processing a plurality of radio signals to identify an active status of a target system among a plurality of communication systems in a coexisting radio network, comprising: an antenna for receiving the radio signals; a squarer coupled to the antenna for squaring the radio signals to produce a plurality of squared radio signals; a filter coupled to the squarer for filtering the squared radio signals to produce filtered signals containing a plurality of fundamental frequencies of the communication systems in the coexisting radio network; a system detecting unit coupled to the filter for identifying the target system in the communication systems by detecting the frequency locations of peak energy corresponding to the fundamental frequencies in the filtered signals; an estimator coupled to the receiver for estimating a power spectrum density of the target system; and a multiple systems monitoring unit coupled to the estimator and the system detecting unit for identifying an active status of the target system by performing spectrum analysis.

To achieve the aforesaid objectives, the present invention further provides an apparatus for processing a plurality of radio signals to identify an active status of a target system among a plurality of communication systems in a coexisting radio network, comprising:

an antenna for receiving the radio signals; a squarer coupled to the antenna for squaring the radio signals to produce a plurality of squared radio signals; a filter coupled to the squarer for filtering the squared radio signals to produce a plurality of filtered signals containing a plurality of fundamental frequencies of the communication systems in the coexisting radio network; and a multiple systems sensing unit coupled to the filter and the antenna for identifying an active status of the target system.

To make it easier for our examiner to understand the objective of the invention, its structure, innovative features, and performance, we use a preferred embodiment together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Throughout the description, we assume that there are Q candidate communication systems. Suppose the transmitted signal of each system is going through a flat uncorrelated Rayleigh fading channel, that is, each with an independent complex amplitude $a_i=|a_i|\cdot e^{j\theta_i}$ where amplitude $|a_i|$ is Rayleigh distributed with $E\{|a_i|^2\}=\gamma_i^2$ and phase $\theta_i$ is uniformly distributed over $[0,2\pi]$. In addition, a white Gaussian noise $w(t)$ with zero mean and variance $\sigma_w^2$ is added to the received radio signal. Suppose the activities of systems are unchanged during the period of each sensing. With the assumption of P active systems ($P \leq Q$,) the received radio signal can be expressed as $$r(t) = \mathrm{Re}\left\{\sum_{i=1}^{P} a_i s_i(t) + w(t)\right\} = \mathrm{Re}\{y(t)+w(t)\}$$

where $s_i(t)$ is the signal of i-th active system and $y(t)=\Sigma_{i=1}^{P} a_i s_i(t)$.

Furthermore, we use the notation $\overline{\overline{A}}$ to represent matrix A, and notation $\overline{B}$ to represent vector B.

The problem of multiple systems sensing is to determine the number of active systems, P, and identify them, respectively.

Figure 1:
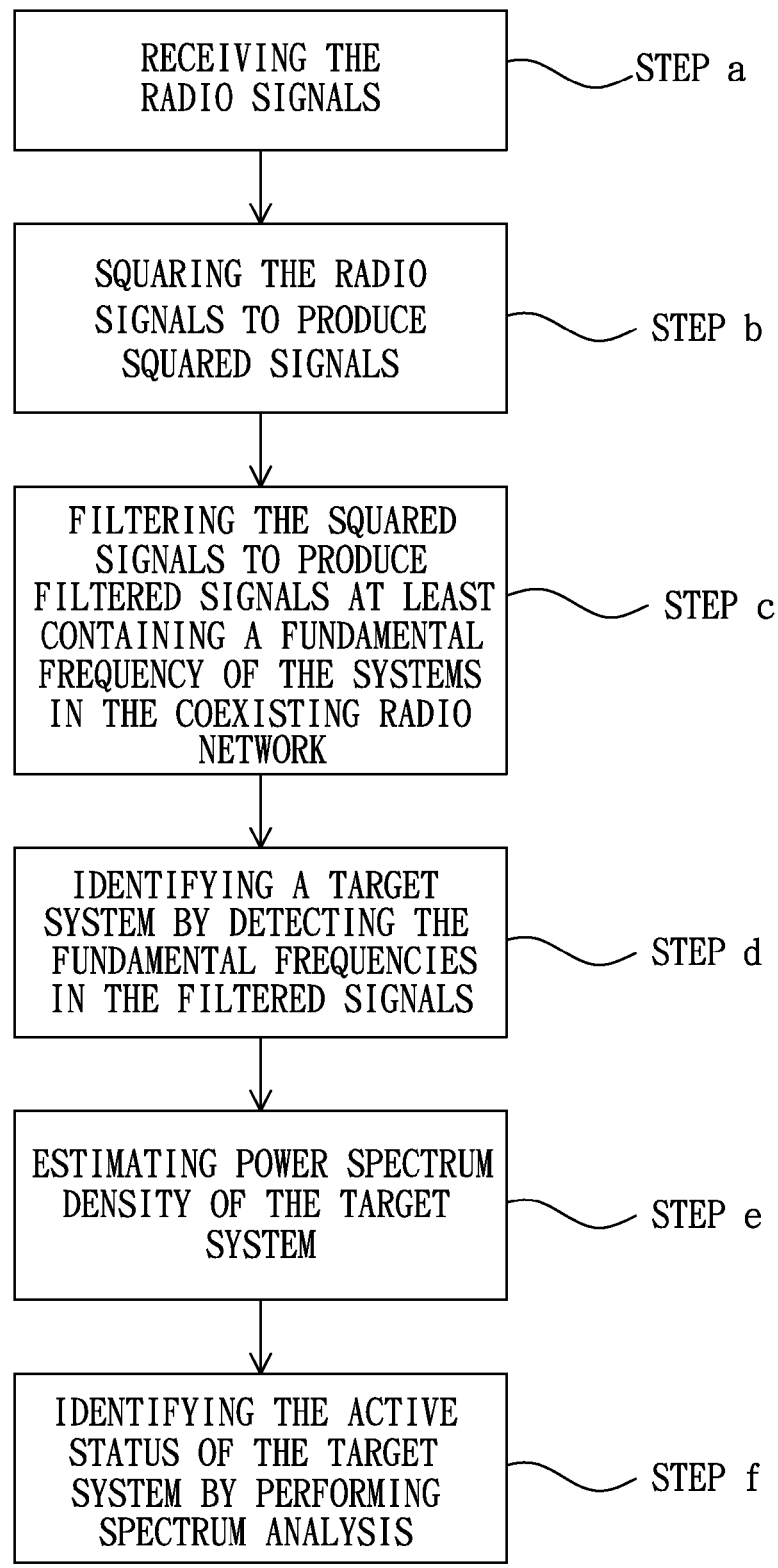
FIG. 1 is the flow chart of a method for processing radio signals to identify an active system in a coexisting radio network according to a preferred embodiment of the present invention.

Please refer to FIG. 1, which shows the flow chart of a method for processing radio signals to identify an active system in a coexisting radio network according to a preferred embodiment of the present invention. As shown in FIG. 1, the method for processing radio signals to identify an active system in a coexisting radio network comprises the steps of receiving the radio signals (Step a), squaring the radio signals to produce squared signals (Step b), filtering the squared signals to produce filtered signals at least containing a fundamental frequency of the systems in the coexisting radio network (Step c), identifying a target system by detecting the fundamental frequencies in the filtered signals (Step d), estimating power spectrum density of the target system (Step e), and identifying the active status of the target system by performing spectrum analysis (Step f).

In Step a, radio signals are received, wherein the radio signals may be 802.11b, 802.11g, Bluetooth or Microwave Oven system. The carrier frequency of the 802.11b system may be 2412 MHZ, 2437 MHZ or 2462 MHZ with a 11 MHz fundamental frequency. The carrier frequency of the 802.11g system may be 2412 MHZ, 2437 MHZ or 2462 MHZ with a 20 MHz fundamental frequency. The fundamental frequency of Bluetooth system is 1 MHz without the fixed carrier frequency. Further, the Microwave Oven system does not have the carrier frequency and fundamental frequency.

In Step b, a squared signal $r^2(t)$ is generated from the radio signals by a squarer. The squared signal $r^2(t)$ can be shown as $$r^2(t) = E\{r^2(t)\} + \varepsilon(t)$$

$$= \frac{1}{2}\sum_{i=1}^{P} \frac{\sigma_i^2 \gamma_i^2}{T_i} Z_{i,1} \cos(2\pi(t-\tau_i)/T_i) +$$

$$\frac{1}{2}\sum_{i=1}^{P} \frac{\sigma_i^2 \gamma_i^2}{T_i} Z_{i,0} + \frac{1}{2}\sigma_w^2 + \varepsilon(t),$$

where $$Z_{i,m} = \frac{1}{2\pi}\int_{-\infty}^{\infty} H_i(j\theta) \cdot H_i^*\left[-j\left(\frac{2\pi m}{T_i} - \theta\right)\right] d\theta,$$

$\varepsilon(t)$ is the disturbance term with zero mean, $T_i$ is the symbol duration, $H_i(j\omega)$ is the frequency response of a pulse-shaping filter, and $\sigma_i^2$ is the variance of the zero mean data sequence $\{x_{i,n}\}$. The presence of a fundamental frequency can be found with an energy peak located at a frequency equal to $1/T_i$.

In Step c, the filtered signals are generated from the squared signals. The filtered signals at least contain a fundamental frequency of the systems in the coexisting radio network. A narrowband filter containing all potential fundamental frequencies is adopted in the step.

In Step d, a target system is identified by detecting the frequency locations of peak energy corresponding to the fundamental frequencies in the filtered signals. For example, for 802.11b, the fundamental frequency is 11 MHZ, for 802.11g, the fundamental frequency is 20 MHZ, and for Bluetooth, the fundamental frequency is 1 MHZ.

In Step e, the power spectrum density of the target system is estimated. Many well-known spectrum estimation method such as the periodogram, Blackman-Tukey method, or Barlett-Welch method can be adopted to derive the spectrum estimated power spectrum vector $\hat{\underline{p}}$.

In Step f, the active status of the target system is identified by performing the spectrum analysis. The spectrum analysis is executed by performing some matrix operations on $\hat{\underline{p}}=\overline{\overline{s}}\cdot\underline{h}+\underline{w}$ or $\overline{\overline{c}}=\overline{\overline{s}}\overline{\overline{\Gamma}}\overline{\overline{s}}^T$, wherein $\hat{\underline{p}}$ is the estimated power spectrum vector, $\underline{h}$ is the received power vector, $\underline{w}$ is the noise contribution to power spectrum, $\overline{\overline{\Gamma}}$ is a Q×Q diagonal matrix with only P nonzero diagonal terms, and $\overline{\overline{c}}$ is the trispectrum matrix expressed as $$\underline{c} = \sum_{i=1}^{P} \gamma_i^A \rho_i P_i P_i^T = \underline{s}\underline{\Gamma}\underline{s}^T.$$

The matrix $s=U\Lambda V^T$ is the power spectrum pattern matrix represented by a Singular Value Decomposition (SVD) where U and V are a M×M orthogonal matrix and a Q×Q orthogonal matrix, respectively, and $\Lambda$ is an M×Q matrix with (ij)-entry $s_{ii}=\zeta_i$ for i=1, 2, . . . Q, and $s_{ij}=0$ otherwise. If the additive noise w is colored Gaussian with known covariance matrix, perform a Singular Value Decomposition (SVD) of the power spectrum pattern matrix to generate the received power vector from the estimated power spectrum vector as $$\underline{V\Lambda^+ U^T}(\underline{\hat{p}}-\underline{w})=\underline{V\Lambda^+ U^T U\Lambda V^T}=\underline{h}$$

Then computing the ratio $\Sigma_{i=1}^{\hat{P}}k_i/\Sigma_{i=1}^{Q}k_i$ with the elements of h arranged in decreasing order like $k_1 \geq k_2 \geq \ldots \geq k_Q$ from $\hat{P}=1$ to the active number when the ratio exceeds a predetermined threshold to determine the active number and identify the active systems therewith.

On the other hand, if the additive noise w is colored Gaussian with unknown covariance matrix, perform an Eigen Values Decomposition (EVD) of the trispectrum matrix as:

$$\underline{c} = \sum_{m=1}^{M} \lambda_m \underline{q}_m \underline{q}_m^H = \underline{G\Sigma G}^H$$

with the eigenvalues arranged in decreasing order $\lambda_1 \geq \lambda_2 \geq \ldots \lambda_M$, where the eigenvalues can be used to generate eigenvectors $\{\underline{q}_i\}_{i=1}^{P}$ for signal subspace and $\{\underline{q}_i\}_{i=P+1}^{M}$ for noise subspace. And MUltiple SIgnal Classification (MUSIC) algorithm can be performed to identify the active systems according to the eigenvectors as:

$$\overline{R}_{music}(i) = \frac{P_i^H P_i}{\sum_{m=Q+1}^{M} |P_i^H \underline{q}_m|^2}$$

with the corresponding P largest values identified as active ones.

Figure 2:
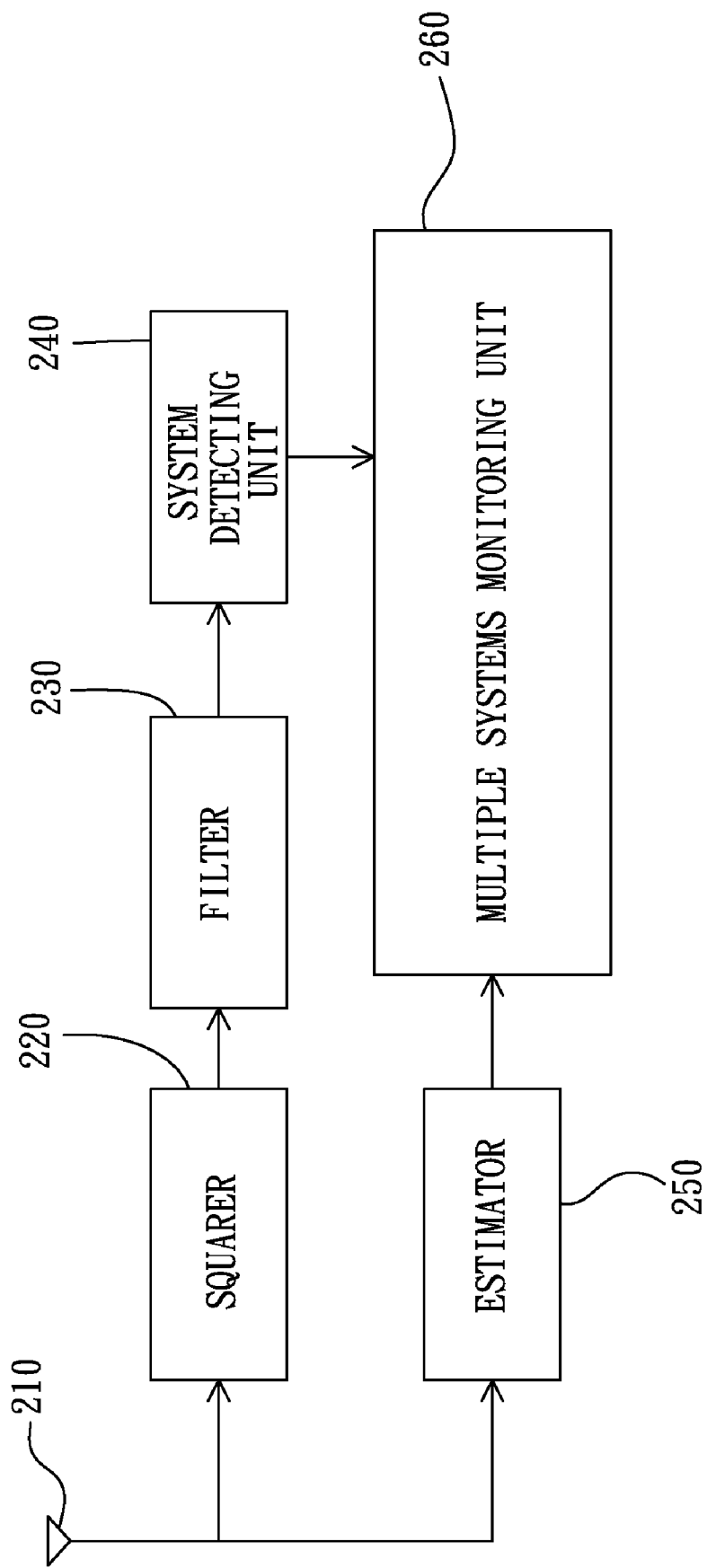
FIG. 2 is a block diagram of an apparatus for processing radio signals to identify an active system in a coexisting radio network according to a preferred embodiment of the present invention.

Please refer to FIG. 2, which shows a block diagram of an apparatus for processing radio signals to identify an active system in a coexisting radio network according to a preferred embodiment of the present invention. As shown in FIG. 2, the apparatus for processing radio signals to identify an active system in a coexisting radio network according to a preferred embodiment of the present invention comprises a receiver 210, a squarer 220, a filter 230, a system detecting unit 240, an estimator 250, and a multiple systems monitoring unit 260.

The receiver 210 is used for receiving radio signals, for example 802.11b, 802.11g, Bluetooth or Microwave Oven radio signals. The squarer 220 is coupled to the receiver 210 for squaring the radio signals to produce squared radio signals. The filter 230 is a narrowband filter coupled to the squarer 220 for filtering the squared radio signals. The filter 230 produces the filtered signals at least containing a fundamental frequency of the systems in the coexisting radio network. The fundamental frequency may be 11 MHz for 802.11b, 20 MHz for 802.11g, or 1 MHz for Bluetooth. The system detecting unit 240 is coupled to the filter 230 for identifying a target system by detecting the frequency locations of peak energy of the fundamental frequencies in the filtered signals. The estimator 250 is coupled to the receiver 210 for estimating power spectrum density of the target system. The multiple systems monitoring unit 260 is coupled to the estimator 250 for identifying the active status of the target system by performing spectrum analysis. If the additive noise is colored Gaussian with known covariance matrix, Singular Value Decomposition (SVD) is performed in the spectrum analysis to identify the active system. On the other hand, if the additive noise is colored Gaussian with unknown covariance matrix, Eigen Values Decomposition (EVD) of the trispectrum matrix and Multiple Signal Classification (MUSIC) algorithm are performed in the spectrum analysis to identify the active system.

Figure 3:
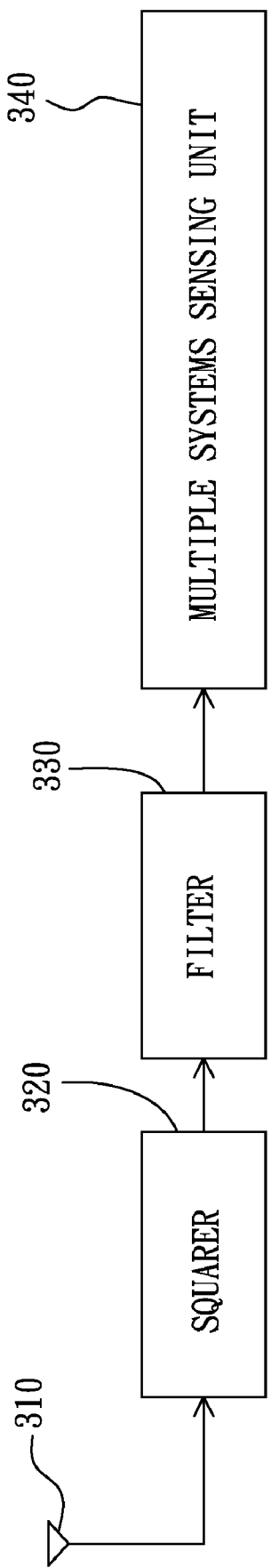
FIG. 3 is a block diagram of an apparatus for processing radio signals to identify an active system in a coexisting radio network according to another preferred embodiment of the present invention.

Please refer to FIG. 3, which shows a block diagram of an apparatus for processing radio signals to identify an active system in a coexisting radio network according to another preferred embodiment of the present invention. As shown in FIG. 3, the apparatus for processing radio signals to identify a active system in a coexisting radio network comprises a receiver 310, a squarer 320, a filter 330, and a multiple systems sensing unit 340.

The receiver 310 is used for receiving radio signals such as 802.11b, 802.11g, Bluetooth or Microwave Oven radio signals. The squarer 320 is coupled to the receiver 310 for squaring the radio signals to produce squared radio signals. The filter 330 is a narrowband filter coupled to the squarer 320 capable of filtering the squared radio signals to produce filtered signals at least containing a fundamental frequency of the systems in the coexisting radio network. The fundamental frequency is 11 MHz for 802.11b, 20 MHz for 802.11g, and 1 MHz for Bluetooth. The multiple systems sensing unit 340 is coupled to the filter 330 and the receiver 310 for identifying the status of the systems.

Figure 4:
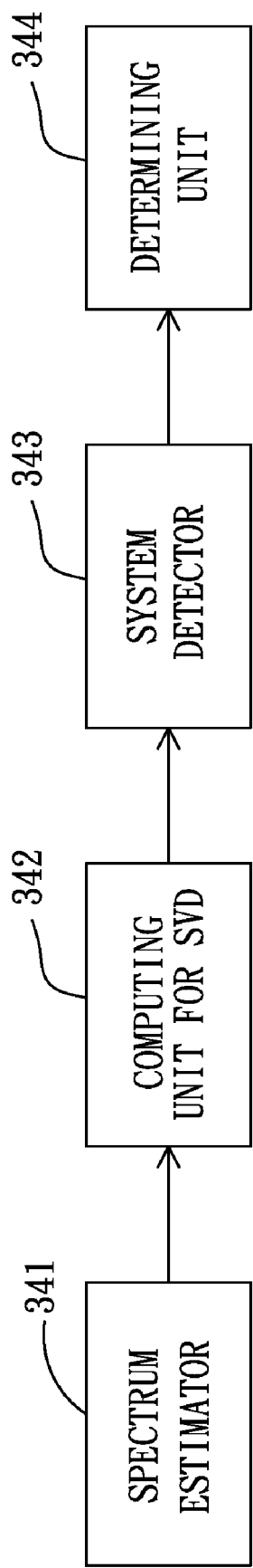
FIG. 4 is a detailed block diagram of the multiple systems sensing unit according to a preferred embodiment of the present invention.

Please refer to FIG. 4, which shows a detail block diagram of the multiple systems sensing unit 340. As shown in FIG. 4, the multiple systems sensing unit 340 further comprises a spectrum estimator 341, a computing unit 342, a system detector 343, and a determining unit 344.

The spectrum estimator 341 is coupled to the filter 330 for estimating the power spectrum density of a target system. The computing unit 342 is coupled to the spectrum estimator 341 for performing Singular Value Decomposition (SVD) of the power spectrum pattern matrix to produce a first information corresponding to the status of the target system if the additive noise is colored Gaussian with known covariance matrix, or performing Eigen Values Decomposition (EVD) of the trispectrum matrix and Multiple Signal Classification (MUSIC) algorithm to produce a first information corresponding to the status if the additive noise is colored Gaussian with unknown covariance matrix. The system detector 343 is coupled to the computing unit 342 for detecting the fundamental frequencies in the filtered signals and producing the second information corresponding to the systems. The determining unit 344 is coupled to the system detector 343 for identifying the status of the systems according to the first information and the second information.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A method for processing a plurality of radio signals to identify an active status of a target system among a plurality of communication systems in a coexisting radio network, comprising the steps of:
   squaring the radio signals to produce a plurality of squared signals;
   filtering the squared signals to produce filtered signals containing a plurality of fundamental frequencies of the communication systems in the coexisting radio network;
   identifying the target system in the communication systems by detecting the frequency locations of peak energy corresponding to the fundamental frequencies in the filtered signals;
   estimating a power spectrum density of the target system; and
   identifying an active status of the target system by performing spectrum analysis.

2. The method according to claim 1, wherein the spectrum analysis is performed by a matrix operation.

3. The method according to claim 2, wherein the matrix operation is a Singular Value Decomposition (SVD) operation.

4. The method according to claim 2, wherein the matrix operation includes an Eigen Values Decomposition (EVD) of the trispectrum matrix operation and a Multiple Signal Classification (MUSIC) operation.

5. The method according to claim 1, wherein the filtered signals is produced by a narrowband filter.

6. The method according to claim 1, wherein one of the systems in the coexisting radio network is 802.11 system, Bluetooth system, UWB system, or Microwave Oven system.

7. An apparatus for processing a plurality of radio signals to identify an active status of a target system among a plurality of communication systems in a coexisting radio network, comprising:
   an antenna for receiving the radio signals;
   a squarer coupled to the antenna for squaring the radio signals to produce a plurality of squared radio signals;
   a filter coupled to the squarer for filtering the squared radio signals to produce filtered signals containing a plurality of fundamental frequencies of the communication systems in the coexisting radio network;
   a system detecting unit coupled to the filter for identifying the target system in the communication systems by detecting the frequency locations of peak energy corresponding to the fundamental frequencies in the filtered signals;
   an estimator coupled to the receiver for estimating a power spectrum density of the target system; and
   a multiple systems monitoring unit coupled to the estimator and the system detecting unit for identifying an active status of the target system by performing spectrum analysis.

8. The apparatus according to claim 7, wherein the spectrum analysis is performed by a matrix operation.

9. The apparatus according to claim 8, wherein the matrix operation is a Singular Value Decomposition (SVD) operation.

10. The apparatus according to claim 8, wherein the matrix operation includes an Eigen Values Decomposition (EVD) of the trispectrum matrix operation and a Multiple Signal Classification (MUSIC) operation.

11. The apparatus according to claim 7, wherein the filter is a narrowband filter.

12. The apparatus according to claim 7, wherein one of the systems in the coexisting radio network is 802.11 system, Bluetooth system, UWB system, or Microwave Oven system.

13. An apparatus for processing a plurality of radio signals to identify an active status of a target system among a plurality of communication systems in a coexisting radio network, comprising:
   an antenna for receiving the radio signals;
   a squarer coupled to the antenna for squaring the radio signals to produce a plurality of squared radio signals;
   a filter coupled to the squarer for filtering the squared radio signals to produce a plurality of filtered signals containing a plurality of fundamental frequencies of the communication systems in the coexisting radio network; and
   a multiple systems sensing unit coupled to the filter and the antenna for identifying an active status of the target system.

14. The apparatus according to claim 13, wherein the multiple systems sensing unit comprising:
   a spectrum estimator coupled to the filter for estimating the power spectrum density of a target system in the communication systems;
   a computing unit coupled to the spectrum estimator for performing Singular Value Decomposition (SVD) operation of the estimated power spectrum density to produce a first information corresponding to the status of the target system;
   a system detector coupled to the computing unit for detecting the fundamental frequencies in the filtered signals and producing the second information corresponding to the systems; and
   a determining unit coupled to the system detector for identifying the status of the target system according to the first information and the second information.

15. The apparatus according to claim 13, wherein the multiple systems sensing unit comprising:
   a spectrum estimator coupled to the filter for estimating the power spectrum density of a target system;
   a computing unit coupled to the spectrum estimator for performing Eigen Values Decomposition (EVD) operation of the trispectrum matrix and Multiple Signal Classification (MUSIC) operation to produce a first information corresponding to the status of the target system;
   a system detector coupled to the computing unit for detecting the frequency locations of peak energy corresponding to the fundamental frequencies in the filtered signals and producing the second information corresponding to the systems; and
   a determining unit coupled to the system detector for identifying the status of the target system according to the first information and the second information.

* * * * *